Aug. 16, 1955     C. K. MONTY     2,715,504
SLIP-CAST SPINNING REEL
Filed Feb. 10, 1953     2 Sheets-Sheet 2

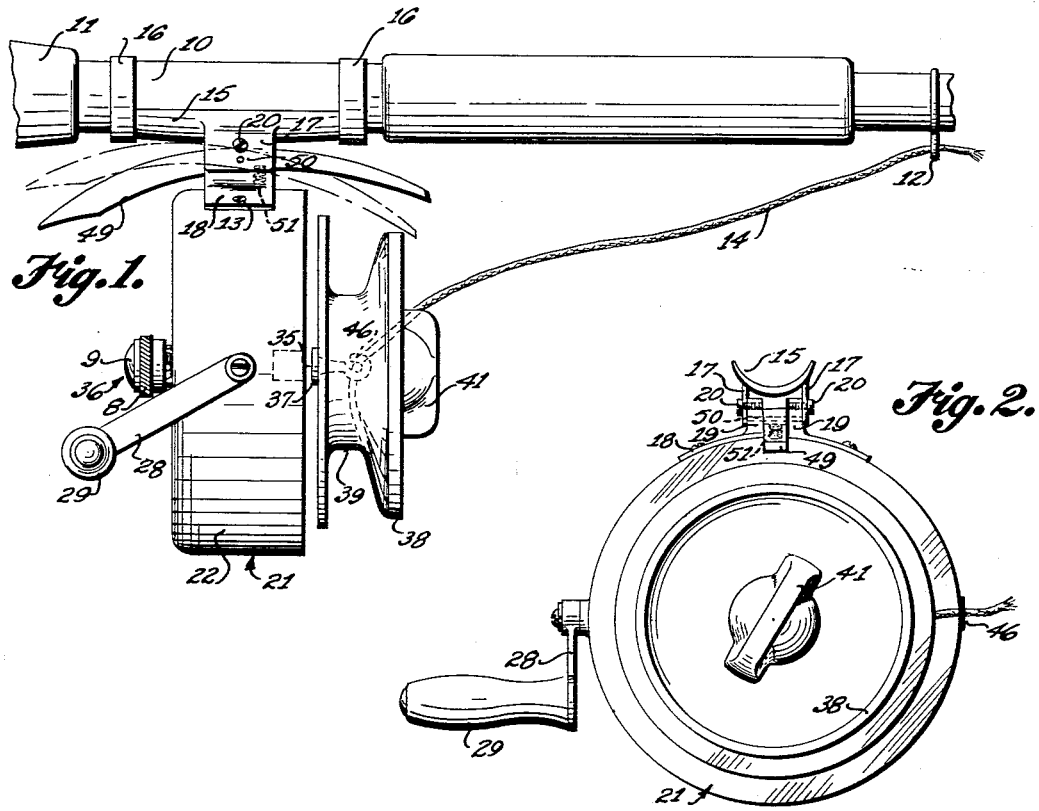

INVENTOR.
Carl K. Monty.
BY Victor J. Evans & Co.
ATTORNEYS

United States Patent Office 2,715,504
Patented Aug. 16, 1955

2,715,504

SLIP-CAST SPINNING REEL

Carl K. Monty, Whitehall, N. Y.

Application February 10, 1953, Serial No. 336,036

1 Claim. (Cl. 242—84.5)

This invention relates to fishing equipment, and more particularly to a fishing reel.

The object of the invention is to provide a slip cast spinning reel which is constructed so that bunching of the line is eliminated, there being a manually operable brake for controlling the travel of the fishing line.

Another object of the invention is to provide a slip cast spinning reel which will prevent breakage of the fishing line and wherein the tension on the drum can be adjusted as desired.

A further object of the invention is to provide a slip cast spinning reel which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the spinning reel of the present invention attached to a fishing rod.

Figure 2 is a front elevational view of the spinning reel of the present invention.

Figure 3 is a rear elevational view of the spinning reel of the present invention.

Figure 4:
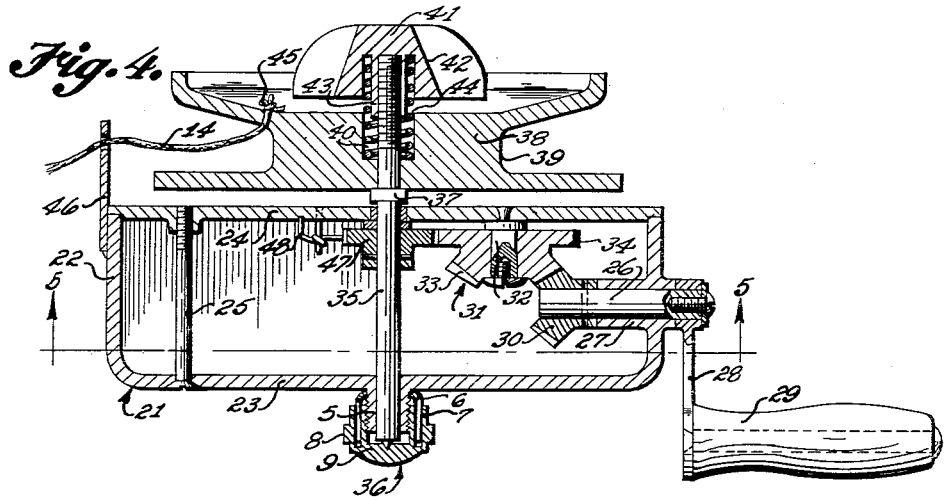
Figure 4 is a sectional view taken on the line 4—4 of Figure 3.
Figure 5:
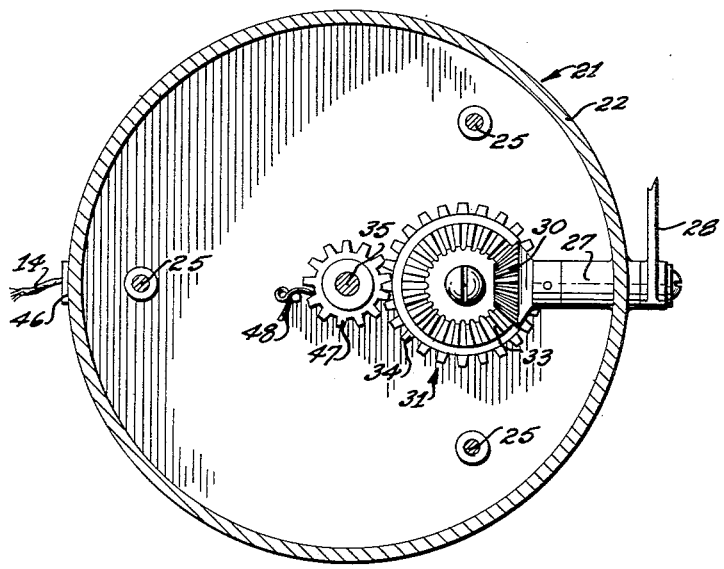
Figure 5 is a sectional view taken on the line 5—5 of Figure 4.

Referring in detail to the drawings, the numeral 10 designates a conventional fishing pole or rod which includes a handle 11, and extending from the fishing pole 10 are line guides 12, Figure 1, and a fishing line 14 extends through the line guides 12. Arranged below a portion of the fishing pole 10 is an arcuate stirrup 15, Figure 2, and the ends of the stirrup 15 are surrounded or embraced by a pair of collars 16.

Depending from the stirrup 15 is a pair of spaced parallel ears 17. Arranged below the stirrup 15 is an arcuate bracket 18, and extending upwardly from the bracket 18 is a pair of spaced parallel lugs 19. Suitable securing elements such as screws 20 serve to connect the ears 17 and lugs 19 together.

Secured to the bracket 18 by suitable securing elements such as screws 13 is a housing 21. The housing 21 includes an annular side wall 22 and an end wall 23, there being a panel 24 detachably connected to the housing by suitable securing elements such as screws or bolts 25, Figure 4. A drive shaft 26 extends through a bearing 27, and a link 28 has one end connected to the drive shaft 26. A handle 29 is connected to the link 28, so that by rotating the handle 29 the shaft 26 will be rotated. Connected to the shaft 26 is a bevel gear 30, and a gear member 31 is rotatably mounted on a stud 32. The gear member 31 includes a bevel gear 33 which is arranged in meshing engagement with the bevel gear 30. The gear member 31 further includes a spur gear 34 for a purpose to be later described.

The bracket 18 is secured to the housing 21 by the screws 13. Extending into the housing 21 is a driven shaft 35 which has its inner end rotatably engaging a bearing 36. A collar 37 is mounted on the shaft 35, and a drum 38 is rotatably mounted on the shaft 35 and abuts the collar 37. The drum 38 is provided with an annular groove or recess 39 which is adapted to have wound therein a portion of the fishing line 14. The drum 38 is further provided with a central recess 40.

A body member or nut 41 has an integral sleeve 43 arranged in threaded engagement with the threaded end portion 42 of the shaft 35, Figure 4. A coil spring 44 extends into the recess 40 and abuts the body member 41.

The fishing line 14 may extend through a suitable aperture in the drum 38, and a knot 45 may be provided on an end of the line 14 for anchoring the line 14 in the drum 38. A line guide 46 is secured to the housing 21 and a portion of the fishing line 14 extends through the line guide 46.

Positioned within the housing 21 and secured to the driven shaft 35 is a gear wheel 47, the gear wheel 47 being arranged in meshing engagement with the spur gear 34. A spring member or clicker 48 is connected to the panel 24, and the spring member or clicker 48 is arranged in engagement with the teeth of the gear wheel 47.

The spinning reel of the present invention further includes a manually operable brake 49 which is pivotally mounted between the lugs 19 by means of a pivot pin 50, and a coil spring 51 serves to normally urge the brake out of engagement with the drum 38.

In use, the stirrup 15 may be attached to the fishing pole 10 by means of the collar 16, and the housing 21 is secured to the bracket 18 by the screws 13. One end of the fishing line 14 is anchored to the rotatable drum 38 by means of the knot 45, and the line 14 passes through the guide 46. Then, to wind the line 14 on the drum 38, the handle 29 is manually rotated and this causes the intermeshing gears within the housing 21 to rotate the shaft 35, and rotation of the shaft 35 causes rotation of the drum 38 whereby the line 14 will be evenly and uniformly wound on the drum 38.

From the foregoing, it is apparent that a fishing reel has been provided wherein the drum 38 will slip when the pull on the fishing line exceeds a predetermined limit. With the present invention the fishing line 14 can be unwound from the drum 38 without the necessity of having the handle 29 rotating due to the slip clutch. However, when the line is being wound on the drum 38, the handle 29 is rotated. The coil spring 51 serves to normally maintain the brake 49 in its open position. Also, there will be no bunching up of the fishing line 14 on the drum 38. The reel is compactly constructed and light in weight and simple to use. In casting, the fishing line 14 can be removed from the line guide 46 and held between the thumb and forefinger. The fishing line is wound by the drum 38 itself so that there is no necessity of using a fixed spool as in other spinning reels. The tension of the coil spring 44 can be adjusted by rotating the body member 41. When casting, the line 14 can be held in the fingers in front of the reel so that the line is free to slip off of the spool or drum 38 when the line is cast. Thus, there will be no resistance to the line when the line is cast so that great distances can be reached. After the line has been cast, the line is arranged in engagement with the guide 46 so that the fishing line 14 will travel in a proper path. Also, the fishing line 14 can be held steady by means of the brake 49 which can be engaged by the user's finger. The clicker 48 is arranged in engagement with the gear 47 and prevents the gear 47 from rotating accidentally in the wrong direction. Also, the fixed line guide 46 eliminates the necessity of using a reciprocating drum and the present invention will make it possible for the user to use either light spinning or the heaviest casting plugs. The spring 44 permits the drum 38 to slip on the drum shaft 35 so that it will be impossible for a fish to break the fishing line 14. The clicker 48 prevents the shaft 35 from turning backwards when a fish pulls on the line so that the drum 38 will be able to turn on the shaft 35 without transmitting force to the crank handle 29. The guide 46 serves to insure that the fishing line 14 will be guided to the center of the drum 38.

The bearing 36 is an adjustable jewel bearing and includes a body member 9 having a knurled collar 8 thereon for rotating the body member. The body member 9 may be provided with a groove 7 for receiving a spring 6, and the body member 9 is adapted to be arranged in threaded engagement with the threaded portion 5 of the housing 21. Thus, the body member 9 will be maintained immobile in its various adjusted positions by means of the spring 6.

The reel of the present invention is easy to use and with a little practice a person will be able to obtain great accuracy in casting. Also, the reel of the present invention is specially good for bait casting, plug casting or light spinning lures. Further, different sized drums can be made for different sizes and quantities of lines for different kinds of fishing, and these parts can be interchangeably used. Thus, in a very short period of time a person with little skill will be able to obtain great accuracy.

I claim:

A slip-cast spinning reel comprising an arcuate stirrup, a pair of spaced parallel ears depending from said stirrup, a curved bracket arranged below said stirrup, a pair of spaced parallel lugs extending upwardly from said bracket and connected to said ears, a hollow housing including an annular side wall secured to said bracket, a panel detachably connected to said housing, a drive shaft extending through said side wall, a handle connected to said drive shaft, a first bevel gear positioned in said housing and connected to said shaft, a gear member rotatably connected to said panel and including a second bevel gear arranged in meshing engagement with said first bevel gear, said gear member further including a spur gear, a driven shaft extending through said panel, an adjustable thrust bearing rotatably engaging said driven shaft and including a body member having a knurled collar thereon, a gear wheel mounted on said driven shaft and meshing with said spur gear, a collar positioned on said driven shaft, a drum rototably mounted on said driven shaft and abutting said collar, said driven shaft being provided with a threaded end portion, said drum being provided with an annular groove for receiving a fishing line, a body member including an integral sleeve arranged in threaded engagement with the threaded portion of said driven shaft, a coil spring interposed between said body member and said drum, there being a central recess in said drum for receiving one end of said coil spring, the other end of said coil spring surrounding said sleeve, a manually operable brake pivotally mounted between said pair of lugs for controlling rotation of said drum, and a coil spring for urging the brake out of engagement with the drum.

References Cited in the file of this patent

UNITED STATES PATENTS

| | | |
|---|---|---|
| 2,344,209 | Lowe | Mar. 14, 1944 |
| 2,512,170 | Oen | June 20, 1950 |
| 2,515,896 | Rakoczy | July 18, 1950 |
| 2,590,369 | Beeler | Mar. 25, 1952 |
| 2,602,602 | Vijande | July 8, 1952 |
| 2,604,272 | Olsen | July 22, 1952 |
| 2,648,505 | Mauborgne | Aug. 11, 1953 |